United States Patent
Ravi et al.

(10) Patent No.: US 11,136,489 B2
(45) Date of Patent: Oct. 5, 2021

(54) LIME-BASED CEMENT COMPOSITION

(71) Applicant: Halliburton Energy Services, Inc., Houston, TX (US)

(72) Inventors: Krishna Ravi, Kingwood, TX (US); Sandip Prabhakar Patil, Pune (IN); Sheetal Singh, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/571,951

(22) Filed: Sep. 16, 2019

(65) Prior Publication Data

US 2020/0010753 A1 Jan. 9, 2020

Related U.S. Application Data

(62) Division of application No. 15/524,468, filed as application No. PCT/US2014/068160 on Dec. 2, 2014, now Pat. No. 10,465,104.

(51) Int. Cl.
| | |
|---|---|
| *C09K 8/46* | (2006.01) |
| *C04B 28/18* | (2006.01) |
| *E21B 33/16* | (2006.01) |
| *E21B 33/138* | (2006.01) |
| *C04B 111/10* | (2006.01) |
| *E21B 21/00* | (2006.01) |

(52) U.S. Cl.
CPC ............... *C09K 8/46* (2013.01); *C04B 28/18* (2013.01); *E21B 33/138* (2013.01); *E21B 33/16* (2013.01); *C04B 2111/1037* (2013.01); *E21B 21/003* (2013.01)

(58) Field of Classification Search
CPC ... C04B 28/18; C04B 2111/1037; C09K 8/46; E21B 21/003; E21B 33/16; E21B 33/167
See application file for complete search history.

(56) References Cited

U.S. PATENT DOCUMENTS

| | | | | |
|---|---|---|---|---|
| 4,105,457 A | * | 8/1978 | Pietsch | C04B 28/26 106/612 |
| 4,257,483 A | | 3/1981 | Morris | |
| 5,352,288 A | * | 10/1994 | Mallow | C04B 28/18 106/605 |
| 5,588,489 A | | 12/1996 | Chatterji et al. | |
| 6,689,208 B1 | | 2/2004 | Brothers | |
| 6,983,800 B2 | | 1/2006 | Chatterji et al. | |
| 2003/0121457 A1 | * | 7/2003 | Butters | C04B 2/06 106/795 |
| 2006/0025312 A1 | | 2/2006 | Santra | |
| 2007/0056732 A1 | | 3/2007 | Roddy | |
| 2011/0172130 A1 | | 7/2011 | Sarap | |
| 2013/0180716 A1 | | 7/2013 | Lende | |
| 2013/0233550 A1 | * | 9/2013 | Brothers | C04B 28/18 166/292 |
| 2014/0034313 A1 | | 2/2014 | Pisklak et al. | |
| 2014/0060389 A1 | * | 3/2014 | Chatterji | C09K 8/473 106/675 |
| 2014/0318784 A1 | | 10/2014 | Chatterji et al. | |

FOREIGN PATENT DOCUMENTS

| | | | | | |
|---|---|---|---|---|---|
| CN | 1093351 A | * | 10/1994 | | C04B 14/10 |
| CN | 101935202 A | * | 1/2011 | | |
| EP | 0467165 A1 | * | 1/1992 | | C01F 11/02 |
| EP | 2514727 A2 | * | 10/2012 | | C04B 28/26 |
| JP | 2003292898 A | * | 10/2003 | | |
| JP | 2006219346 A | * | 8/2006 | | |
| SU | 1590459 A1 | * | 9/1990 | | C04B 28/26 |
| WO | WO-2011026723 A1 | * | 3/2011 | | C04B 40/0042 |
| WO | WO-2014026938 A1 | * | 2/2014 | | C04B 40/0039 |

OTHER PUBLICATIONS

International Search Report and Written Opinion dated Jul. 31, 2015; International PCT Application No. PCT/US2014/068160.

* cited by examiner

*Primary Examiner* — Anthony J Green
(74) *Attorney, Agent, or Firm* — McGuireWoods LLP

(57) ABSTRACT

A cement composition for use in a well that penetrates a subterranean formation comprising: hydrated lime; a silicate; and water, wherein the composition is substantially free of a hydraulic cement. A method of treating a subterranean formation comprising: introducing the cement composition into the subterranean formation; and allowing the cement composition to set.

20 Claims, 4 Drawing Sheets

LIME-BASED CEMENT COMPOSITION

CROSS-REFERENCE TO RELATED APPLICATIONS

This application is a divisional of U.S. patent application Ser. No. 15/524,468 filed on May 4, 2017, now U.S. Pat. No. 10,465,104 issued on Nov. 5, 2019, entitled LIME-BASED CEMENT COMPOSITION, which is a 371 of International application no. PCT/US2014/068160, filed Dec. 2, 2014 both of which are incorporated herein by reference.

TECHNICAL FIELD

Cement compositions can be used in a variety of oil or gas operations. Cement compositions can be used to prevent lost circulation into a subterranean formation. A lime-based cement composition can be used as a lost-circulation material.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
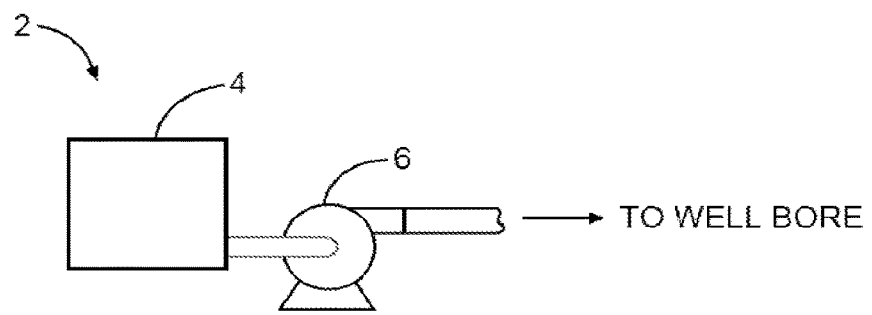
FIG. 1 illustrates a system for preparation and delivery of a cement composition to a wellbore according to certain embodiments.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

A well can include, without limitation, an oil, gas, or water production well, an injection well, a geothermal well, or a high-temperature and high-pressure (HTHP) well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore to form a cement sheath. As used herein, a "cement composition" is a mixture of at least cement and water that develops compressive strength or sets. A cement composition is generally a slurry, in which the water is the external phase of the slurry and the cement (and any other insoluble particles) is the internal phase. The external phase of a cement composition can include dissolved solids. As used herein, the word "cement" means a binder, which is a dry substance that develops compressive strength and can set and can bind other materials together when mixed with water. Cement can be a non-hydraulic cement or a hydraulic cement. Non-hydraulic cements, such as hydrated lime, will not set in wet conditions or underwater. By contrast, hydraulic cements, such as Portland cement, can set in wet conditions or underwater.

Cement compositions can be used to prevent fluid loss, known as lost circulation, into the subterranean formation. By way of example, vugs and fissures can be located in a subterranean formation. The vugs and fissures are highly-permeable areas whereby some of the liquid portion of a base fluid can undesirably flow into these highly-permeable areas. To help prevent or reduce the amount of fluid lost into the formation, a lost-circulation fluid can be used. A lost-circulation fluid can become viscous and form a gel or possess gel-like properties after introduction into the subterranean formation. The viscosity and/or gel structure can help the fluid flow into the highly-permeable areas and remain within the areas instead of being washed away in other wellbore fluids. Additionally, a cement composition can then set within the areas to more permanently fill the voids and reduce or eliminate fluid loss into the subterranean formation.

It is necessary for a cement composition to remain pumpable during introduction into the well and until the cement composition is situated in the portion of the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the composition to set.

There is a need for a cement composition that has consistent properties that can be used to prevent fluid loss into a subterranean formation. It has been discovered that a lime-based cement composition can be used in wellbore operations. The lime-based cement composition can be used as a lost-circulation material.

It is desirable for a cement composition to have certain properties, such as a desired rheology, thickening time, and compressive strength.

If any laboratory test (e.g., compressive strength) requires the step of mixing, then the cement composition is mixed according to the following procedure. The water is added to a mixing container and the container is then placed on a mixer base. The motor of the base is then turned on and maintained at 4,000 revolutions per minute "rpm" (+/−200 rpm). The cement and any other ingredients are added to the container. The ingredients and cement can be added at different times during the mixing. After all the ingredients have been added to the water in the container, a cover is then placed on the container, and the cement composition is mixed at 4,000 rpm (+/−200 rpm) for 1 min.

It is also to be understood that if any laboratory test requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). The purpose of the specific rate of temperature ramping during measurement is to simulate the temperature profile experienced by the cement composition as it is being pumped downhole. After the cement composition is ramped up to the specified temperature and possibly specified pressure, the cement composition is maintained at that temperature and pressure for the duration of the testing.

A cement composition should exhibit good rheology. Rheology is a measure of how a material deforms and flows. As used herein, the "rheology" of a cement composition is measured according to ANSI/API 10B-2 section 11, Recommended Practice for Testing Well Cements, Second Edition, April 2013 as follows. The cement composition is mixed. The cement composition is placed into the test cell of a rotational viscometer, such as a FANN® Model 35 viscometer, fitted with a FYSA attachment and an F1 spring. The cement composition is tested at the specified temperature and ambient pressure, about 1 atm (0.1 MPa). Rheology readings are taken at multiple revolutions per minute "rpm," for example, at 3, 6, 100, 200, 300, and 600.

A "gel" refers to a substance that does not easily flow and in which shearing stresses below a certain finite value fail to produce permanent deformation. A substance can develop gel strength. The higher the gel strength, the more likely the substance will become a gel. Conversely, the lower the gel strength, the more likely the substance will remain in a fluid state. Although there is not a specific dividing line for determining whether a substance is a gel, generally, a substance with a 10 minute gel strength greater than 30 lb/100 ft² (1,436 Pa) will become a gel. Alternatively, generally, a substance with a 10 minute gel strength less than 30 lb/100 ft² (1,436 Pa) will remain in a fluid state. A flat gel indicates that the gelation of the substance is not gaining much strength with time; whereas, a progressive gel indicates that the gelation of the substance is rapidly gaining strength with time. A gel can be a fragile gel. A fragile gel is a fluid that acts like a gel when allowed to remain static for a period of time (i.e., no external force is applied to the fluid) thus exhibiting good suspending properties, but can be broken into a liquid or pumpable state by applying a force to the gel. Conversely, a progressive gel may not be breakable, or a much higher force may be required to break the gel. The drilling fluid can be a fragile gel.

As used herein, the "10 s gel strength" of a cement composition is measured according to ANSI/API 10B-2 section 11, Recommended Practice for Testing Well Cements, Second Edition, April 2013 as follows. After the rheology testing of the cement composition is performed, the cement composition is allowed to sit in the test cell for 10 seconds (s). The motor of the viscometer is then started at 3 rpm. The maximum deflection on the dial reading is the gel strength at 10 s in units of lb/100 ft². As used herein, the "10 min gel strength" is measured as follows. After the initial gel strength test has been performed, the cement composition is allowed to sit in the test cell for 10 minutes (min). The motor of the viscometer is then started at 3 rpm. The maximum deflection on the dial reading is the gel strength at 10 min in units of lb/100 ft². To convert the units from lb/100 ft² to Pascal (Pa), the dial reading is multiplied by 0.511.

As used herein, the "thickening time" is how long it takes for a cement composition to become unpumpable at a specified temperature and pressure. The pumpability of a cement composition is related to the consistency of the cement composition. The consistency of a cement composition is measured in Bearden units of consistency (Bc), a dimensionless unit with no direct conversion factor to the more common units of viscosity. As used herein, a cement composition becomes "unpumpable" when the consistency of the substance reaches 70 Bc. As used herein, the consistency of a cement composition is measured according to ANSI/API 10B-2 section 9, Recommended Practice for Testing Well Cements, Second Edition, April 2013 as follows. The cement composition is mixed. The cement composition is then placed in the test cell of a High-Temperature, High-Pressure (HTHP) consistometer, such as a FANN® Model 275 or a Chandler Model 8240, at a specified temperature and pressure. Consistency measurements are taken continuously until the cement composition exceeds 70 Bc.

A cement composition can develop compressive strength. Cement composition compressive strengths can vary from 50 psi to over 10,000 psi (0 to over 69 MPa). Compressive strength is generally measured at a specified time after the cement composition has been mixed and at a specified temperature and pressure. Compressive strength can be measured, for example, at a time of 24 hours. According to ANSI/API 10B-2, Recommended Practice for Testing Well Cements, compressive strength can be measured by either a destructive method or non-destructive method.

The non-destructive method continually measures correlated compressive strength of a cement composition sample throughout the test period by utilizing a non-destructive sonic device such as an Ultrasonic Cement Analyzer (UCA)

available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a specified temperature and pressure. As used herein, the "initial setting time" is the difference in time between when the dry ingredients are added to the water and when the cement composition is initially set.

As used herein, the term "set," and all grammatical variations thereof, are intended to mean the process of becoming hard or solid by curing. As used herein, the "setting time" is the difference in time between when the dry ingredients are added to the water and when the cement composition has set at a specified temperature. It can take up to 48 hours or longer for a cement composition to set.

According to an embodiment, a cement composition for use in a well that penetrates a subterranean formation comprises: hydrated lime; a silicate; and water, wherein the cement composition is substantially free of a hydraulic cement.

According to another embodiment, a method of treating a subterranean formation comprises: introducing the cement composition into the subterranean formation; and allowing the cement composition to set.

It is to be understood that the discussion of preferred embodiments regarding the cement composition or any ingredient in the cement composition, is intended to apply to the composition embodiments and the method embodiments. Any reference to the unit "gallons" means U.S. gallons.

The cement composition includes hydrated lime. Hydrated lime, which is also known as slaked lime, building lime, fat lime, among other names, includes the main ingredient of calcium hydroxide. Hydrated lime can also contain smaller quantities (i.e., less than about 30% by weight) of any of the following ingredients: calcium carbonate; calcium oxide; magnesium oxide; silicon oxide; aluminum oxide; iron oxide; and trace elements. The hydrated lime can be in powder form.

The cement composition also includes a silicate. A silicate is a compound having an anion with the formula $SiO_2$. The silicate can have a cation selected from the group consisting of calcium, sodium, or potassium. According to certain embodiments, the silicate is sodium silicate (having the general formula $Na_2(SiO_2)_nO$). Commercially-available examples of a suitable silicate include ECONOLITE™ disodium silicate additive, marketed by Halliburton Energy Services, Inc.

The cement composition also includes water. The water can be selected from the group consisting of freshwater, brackish water, and saltwater, in any combination thereof in any proportion. The composition can also include a water-soluble salt. Preferably, the salt is selected from sodium chloride, calcium chloride, calcium bromide, potassium chloride, potassium bromide, magnesium chloride, and any combination thereof in any proportion. The salt can be in a concentration in the range of about 0.1% to about 40% by weight of the water.

The hydrated lime and at least the silicate can react in the presence of water to form a C—S—H gel. Silicate phases of certain substances form hydration products of at least calcium silicate hydrate and calcium hydroxide (abbreviated by cement chemists as CH). Calcium silicate hydrate is often abbreviated as C—S—H. The dashes indicate there is no strict ratio of CaO to $SiO_2$ inferred. The hydration products occupy a larger volume in the cement composition compared to the solid phases. Consequently, the cement composition is converted from a viscous slurry into a rigid solid material. C—S—H can represent up to 70% by volume of a cement composition matrix and is primarily what gives the cement composition its mechanical properties, such as compressive strength.

The cement composition is substantially free of a hydraulic cement. Examples of "hydraulic cement" include, but are not limited to, Portland cement, high-aluminate cements, and slag cement. As used herein, the phrase "substantially free of" means that the cement composition can include less than about 5% by weight of the hydrated lime of the specified ingredient; however, trace amounts can be present in the final cement composition. This phrase is meant to allow the cement composition to include trace amounts of a hydraulic cement to account for the inadvertent possibility that a manufacturer might have some small amount of a hydraulic cement included in the hydrated lime.

Without being limited by theory, it is believed that it is the interaction between the hydrated lime, water, and reactive $SiO_2$ from the silicate and/or amorphous silica allows the ingredients to form a C—S—H-rich gel. According to certain embodiments, the cement composition becomes a gel after the hydrated lime and the silicate are added to the water. The cement composition can be a progressive gel. The cement composition can have a 10 minute gel strength of at least 20 lb/ft$^2$, alternatively at least 30 lb/ft$^2$, at a temperature of 80° F. (27° C.).

According to certain embodiments, the silicate is in a concentration such that the cement composition develops a 10 min. gel strength of at least 20 lb/ft$^2$, alternatively at least 30 lb/ft$^2$, at a temperature of 80° F. (27° C.). The silicate can also be in a concentration in the range of about 0.5% to about 15% by weight of the hydrated lime.

The cement composition can have a density of at least 9 pounds per gallon "ppg" (1.1 kilograms per liter "kg/L"). The cement composition can have a density in the range of about 9 to about 22 ppg (about 1.1 to about 2.6 kg/L).

The cement composition can have a thickening time in the range of about 2 to about 15 hours, alternatively of about 3 to about 12 hours, at a temperature of 80° F. (27° C.). The cement composition can have a thickening time in the range of about 2 to about 15 hours, alternatively of about 3 to about 12 hours, at the bottomhole temperature and pressure of the subterranean formation. As used herein, the term "bottomhole" means the location within the subterranean formation where the cement composition is situated.

The cement composition can have a compressive strength greater than 50 psi (0.3 MPa) at a temperature of 120° F. (49° C.), a pressure of 3,000 psi (20.7 MPa), and a time of 24 hours. The cement composition can also have a compressive strength greater than 50 psi (0.3 MPa) at the bottomhole temperature of the subterranean formation. The cement composition can have a setting time of less than 48 hours, preferably less than 24 hours, at the bottomhole temperature of the subterranean formation. The cement composition can set and develop compressive strength, even though the cement composition may not develop as high a compressive strength as cement compositions that contain hydraulic cements, such as Portland cements.

The cement composition can further include other additives. Examples of other additives include, but are not limited to, amorphous silica, a viscosifier, a filler, a strength enhancer, a light-weight additive, a defoaming agent, a high-density additive, a mechanical property enhancing additive, a lost-circulation material, a filtration-control additive, a thixotropic additive, a set retarder, a set accelerator, and combinations thereof.

The cement composition can include amorphous silica. The amorphous silica can work in tandem with the hydrated lime and the silicate to provide the desired 10 min. gel strength, thickening time, and compressive strength. Commercially-available examples of suitable silica are MICRO-BLOCK® cement additive and SILICALITE™ cement additive, marketed by Halliburton Energy Services, Inc. The silica can also be fumed silica or compacted silica. The silica can be in a concentration in the range of about 1% to about 150% by weight of the hydrated lime.

The cement composition can include a viscosifier. The viscosifier can help provide the desired 10 min. gel strength and thickening time. The viscosifier can be selected from the group consisting of a clay (including natural and synthetic or modified clays), cellulose and its derivatives, xanthan gum, guar gum, polymers, and combinations thereof. Commercially-available examples of suitable viscosifiers are LAPONITE EP® from BYK Additives, THERMA-VIS™, FWCA™, WG-18™, and HALAD®-344 marketed by Halliburton Energy Services, Inc. The viscosifier can be in a concentration in the range of about 0.01% to about 5% by weight of the water.

The cement composition can include a filler. Suitable examples of fillers include, but are not limited to, fly ash, sand, clays, and vitrified shale. The filler can be in a concentration in the range of about 5% to about 50% by weight of the cement (bwoc).

The cement composition can include a set retarder. Suitable examples of commercially-available set retarders include, but are not limited to, and are marketed by Halliburton Energy Services, Inc. under the tradenames HR®-4, HR®-5, HR®-6, HR®-12, HR®-20, HR®-25, SCR-100™, SCR-200L™, and SCR-500™. The set retarder can be in a concentration in the range of about 0.05% to about 10% bwoc.

The cement composition can include a strength-retrogression additive. Suitable examples of commercially-available strength-retrogression additives include, but are not limited to, and are marketed by Halliburton Energy Services, Inc. under the trade names SSA-1™ and SSA-2™. The strength-retrogression additive can be in a concentration in the range of about 5% to about 50% bwoc.

The cement composition can include a light-weight additive. Suitable examples of commercially-available light-weight additives include, but are not limited to, and are marketed by Halliburton Energy Services, Inc. under the tradenames SPHERELITE® and LUBRA-BEADS® FINE; and available from 3M in St. Paul, Minn. under the tradenames HGS2000™, HGS3000™, HGS4000™, HGS5000™, HGS6000™, HGS10000™, and HGS18000™ glass bubbles. The light-weight additive can be in a concentration in the range of about 5% to about 50% bwoc.

Commercially-available examples of other additives include, but are not limited to, and are marketed by Halliburton Energy Services, Inc. under the tradenames: HIGH DENSE® No. 3, HIGH DENSE® No. 4, BARITE™, and MICROMAX™, heavy-weight additives; WELLLIFE® 665, WELLLIFE® 809, and WELLLIFE® 810 mechanical property enhancers; and STEELSEAL@ and BARAC-ARB® lost-circulation materials.

FIG. 1 illustrates a system that can be used in the preparation of a cement composition and delivery to a wellbore according to certain embodiments. As shown, the cement composition can be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 can be located on one or more cement trucks. In some embodiments, a jet mixer can be used, for example, to continuously mix the cement composition, including water, as it is being pumped to the wellbore.

Figure 2A:
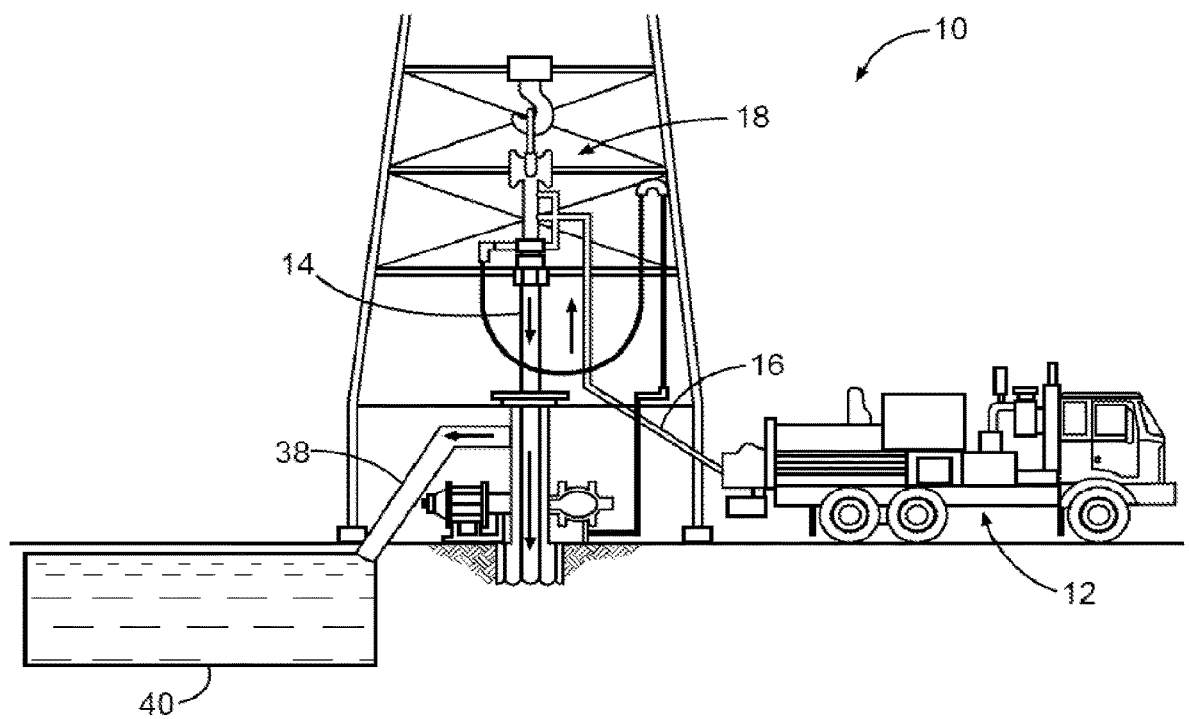
FIG. 2A illustrates surface equipment that may be used in placement of a cement composition into a wellbore.

An example technique and system for introducing the cement composition into a subterranean formation will now be described with reference to FIGS. 2A and 2B. FIG. 2A illustrates surface equipment 10 that can be used to introduce the cement composition. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. The surface equipment 10 can include a cementing unit 12, which can include one or more cement trucks, mixing equipment 4, and pumping equipment 6 (e.g., as depicted in FIG. 1). The cementing unit 12 can pump the cement composition 14 through a feed pipe 16 and to a cementing head 18, which conveys the cement composition 14 downhole.

The method embodiments include the step of introducing the cement composition into the subterranean formation 20. Turning now to FIG. 2B, the cement composition 14 can be introduced into a subterranean formation 20. The step of introducing can include pumping the cement composition into the subterranean formation using one or more pumps 6. The step of introducing can be for the purpose of at least one of the following: well completion; foam cementing; primary or secondary cementing operations; well-plugging; squeeze cementing; and gravel packing. The cement composition can be in a pumpable state before and during introduction into the subterranean formation 20. In an embodiment, the subterranean formation 20 is penetrated by a well 22. The well can be, without limitation, an oil, gas, or water production well, an injection well, a geothermal well, or a high-temperature and high-pressure (HTHP) well. According to this embodiment, the step of introducing includes introducing the cement composition into the well 22. The wellbore 22 comprises walls 24. A surface casing 26 can be inserted into the wellbore 22. The surface casing 26 can be cemented to the walls 24 via a cement sheath 28. One or more additional conduits (e.g., intermediate casing, production casing, liners, etc.) shown here as casing 30 can also be disposed in the wellbore 22. One or more centralizers 34 can be attached to the casing 30, for example, to centralize the casing 30 in the wellbore 22 prior to and during the cementing operation. According to another embodiment, the subterranean formation 20 is penetrated by a wellbore 22 and the well includes an annulus 32 formed between the casing 30 and the walls 24 of the wellbore 22 and/or the surface casing 26. According to this other embodiment, the step of introducing includes introducing the cement composition into a portion of the annulus 32.

Figure 2B:
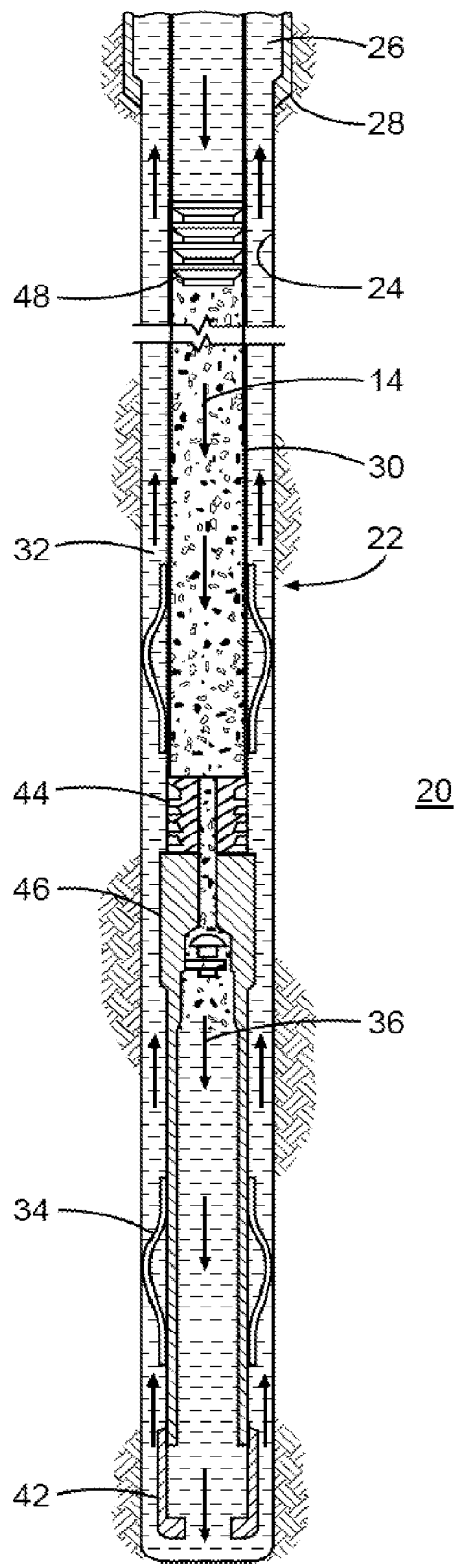
FIG. 2B illustrates placement of a cement composition into an annulus of a wellbore.

With continued reference to FIG. 2B, the cement composition 14 can be pumped down the interior of the casing 30. The cement composition 14 can be allowed to flow down the interior of the casing 30 through the casing shoe 42 at the bottom of the casing 30 and up around the casing 30 into the annulus 32. While not illustrated, other techniques can also be utilized for introduction of the cement composition 14. By way of example, reverse circulation techniques can be used that include introducing the cement composition 14 into the subterranean formation 20 by way of the annulus 32 instead of through the casing 30.

As it is introduced, the cement composition 14 may displace other fluids 36, such as drilling fluids and/or spacer fluids that may be present in the interior of the casing 30 and/or the annulus 32. At least a portion of the displaced fluids 36 can exit the annulus 32 via a flow line 38 and be deposited, for example, in one or more retention pits 40 (e.g., a mud pit), as shown in FIG. 2A. Referring again to FIG. 2B, a bottom plug 44 can be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 can be introduced into the wellbore 22 behind the cement composition 14. The top plug 48 can separate the cement composition 14 from a displacement fluid and also push the cement composition 14 through the bottom plug 44.

The method embodiments also include the step of allowing the cement composition to set. The step of allowing can be performed after the step of introducing the cement composition into the subterranean formation. The method embodiments can include the additional steps of perforating, fracturing, or performing an acidizing treatment, after the step of allowing.

EXAMPLES

To facilitate a better understanding of the present invention, the following examples of certain aspects of preferred embodiments are given. The following examples are not the only examples that could be given according to the present invention and are not intended to limit the scope of the invention.

Figure 3:
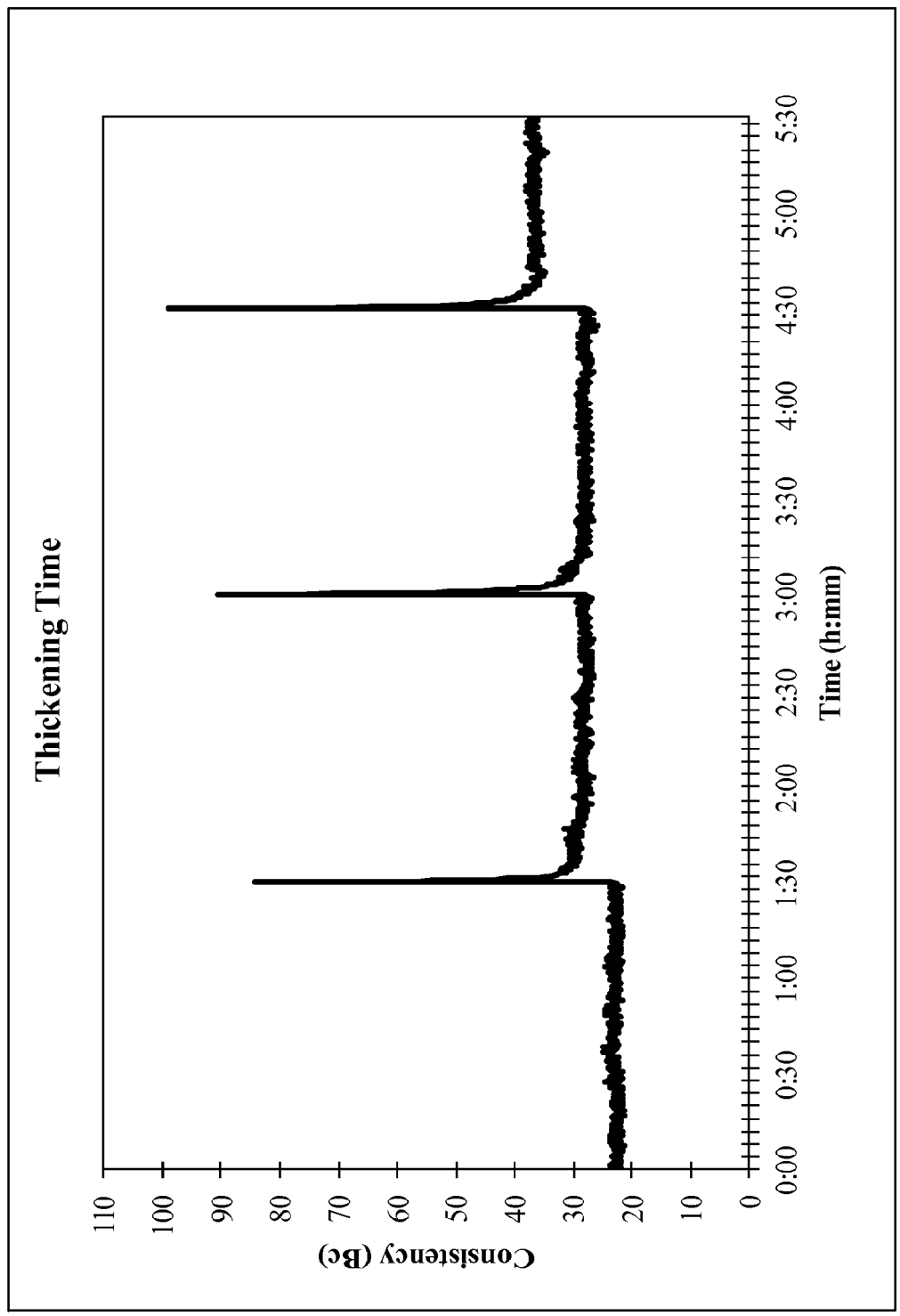
FIG. 3 is a graph of the Thickening Time of a lime-based cement composition.
Figure 4:
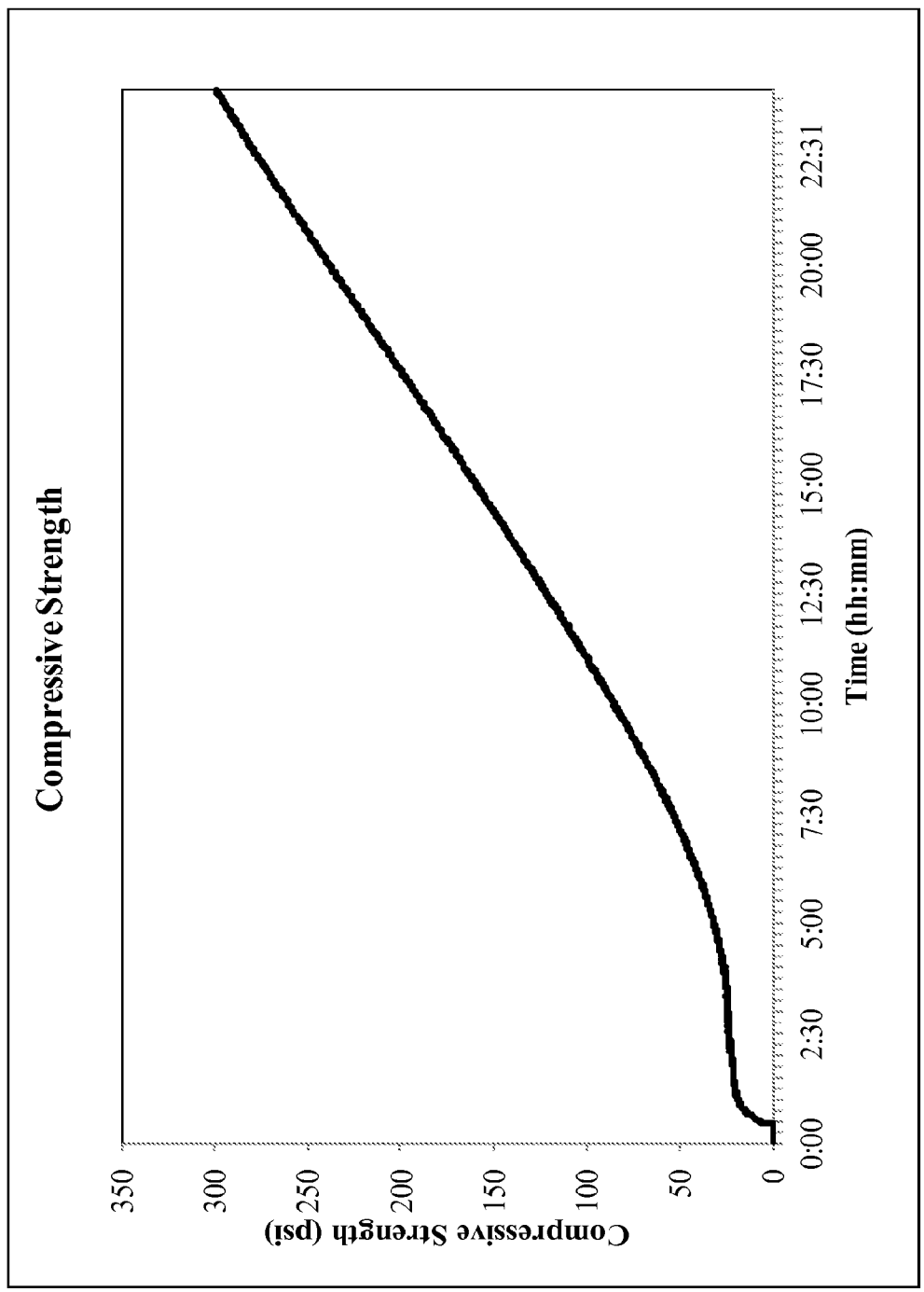
FIG. 4 is a graph of the Compressive Strength of the lime-based cement composition.

For Table 1 and FIGS. 3 and 4, cement compositions were prepared and contained hydrated lime; water at a concentration of 30.1 gallons per sack (gal/sk) of the lime; LAPONITE EP® viscosifier at a concentration of 0.8% by weight of the water; MICROBLOCK® amorphous silica at a concentration of 8 gal/sk of the lime; and ECONOLITE™ as the silicate at a concentration of 0.4 gal.sk of the lime. The cement compositions had a density of 10 pounds per gallon (2 kilograms per liter). The cement compositions were mixed and tested according to the specifics for each test in the Detailed Description section above.

Table 1 lists the rheology and 10 sec. and 10 min. gel strengths of the cement composition at two different temperatures. As can be seen, the cement compositions had very good rheologies that were comparable to each other. Both of the cement compositions formed a gel, with the cement composition tested at 120° F. (49° C.) forming a stronger gel.

TABLE 1

| Temperature | Rheology | | | | | 10 sec. gel strength (lb/ft²) | 10 min. gel strength (lb/ft²) |
| --- | --- | --- | --- | --- | --- | --- | --- |
| | 3 | 6 | 100 | 200 | 300 | | |
| 80° F. (27° C.) | 43 | 45 | 49 | 52 | 55 | 50 | 80 |
| 120° F. (49° C.) | 40 | 42 | 50 | 52 | 54 | 40 | 102 |

FIG. 3 is a graph of the consistency in Bearden units of consistency versus time to show the thickening time of the cement composition. Thickening time was tested at a temperature of 120° F. (49° C.) and a pressure of 2,000 psi (1.4 MPa). As can be seen, the cement composition has a thickening time in the range of about 1.5 hours to about 5 hours.

FIG. 4 is a graph of the compressive strength stress (psi) versus time of the cement composition. As can be seen, the cement composition develops good compressive strength over 24 hours.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A cement composition for use in a well that penetrates a subterranean formation consisting essentially of:
   a slurry of:
      hydrated lime;
      a silicate comprising a cation selected from the group consisting of sodium, potassium, or a combination thereof; wherein the silicate is present in a concentration in the range of about 0.5% to about 15% by weight of the hydrated lime;
      water;
      amorphous silica in a concentration in the range of about 1% to about 150% by weight of the hydrated lime; and
      optionally, one or more additives selected from the group consisting of a viscosifier, a filler, a strength enhancer, a light-weight additive, a defoaming agent, a high-density additive, a mechanical property enhancing additive, a lost-circulation material, a filtration-control additive, a thixotropic additive, and combinations thereof;
      wherein the composition is substantially free of a hydraulic cement comprising Portland cement, high-aluminate cement, or slag cement,
      wherein the cement composition is substantially free of fly ash.

2. The composition of claim 1, wherein the cement composition has a density in the range of about 9 to about 22 pounds per gallon.

3. The composition of claim 1, wherein the cement composition has a setting time of about less than 24 hours.

4. The composition of claim 1, wherein the hydrated lime and at least the silicate react in the presence of water to form a calcium silicate hydrate gel.

5. The composition of claim 1, wherein the cement composition develops a 10 minute gel strength of at least 20 lb/ft2 at a temperature of 80° F.

6. The composition of claim 1, wherein the cement composition has a thickening time in the range of about 2 to about 15 hours at a temperature of 80° F.

7. The composition of claim 1, wherein the cement composition develops a compressive strength greater than 50 psi at a temperature of 120° F., a pressure of 3,000 psi, and a time of 24 hours.

8. The composition of claim 1, wherein the water comprises water selected from the group consisting of freshwater, brackish water, saltwater, and any combination thereof.

9. The composition of claim 4, wherein the cement composition becomes a gel after the hydrated lime and the silicate are mixed with the water.

10. The composition of claim 1, wherein the cement composition has a density in the range of about 12 to about 18 pounds per gallon.

11. A cement composition for use in a well that penetrates a subterranean formation consisting of:
    a slurry of:
       hydrated lime, wherein the hydrated lime is in powder form;
       a silicate cation comprising a cation selected from the group consisting of sodium, or potassium, wherein the silicate is present in a concentration in the range of about 0.5% to about 15% by weight of the hydrated lime; and
       water;
       amorphous silica in a concentration in the range of about 1% to about 150% by weight of the hydrated lime; and
       at least one additive selected from the group consisting of a viscosifier, a filler, a strength enhancer, a light-weight additive, a defoaming agent, a high-density additive, a mechanical property enhancing additive, a lost-circulation material, a filtration-control additive, a thixotropic additive, and combinations thereof;
       wherein the cement composition is substantially free of hydraulic cement comprising Portland cement, high-aluminate cement, or slag cement;
       wherein the cement composition is substantially free of fly ash.

12. The composition of claim 11, wherein the cement composition has a setting time of about less than 24 hours.

13. The composition of claim 11, wherein the hydrated lime and at least the silicate react in the presence of water to form a calcium silicate hydrate gel.

14. The composition of claim 13, wherein the cement composition becomes a gel after the hydrated lime and the silicate are mixed with the water.

15. The composition of claim 11, wherein the water comprises water selected from the group consisting of freshwater, brackish water, saltwater, and any combination thereof.

16. The composition of claim 11, wherein the cement composition has a density in the range of about 9 to about 22 pounds per gallon.

17. The composition of claim 11, wherein the cement composition develops a 10 minute gel strength of at least 20 lb/ft2 at a temperature of 80° F.

18. The composition of claim 11, wherein the cement composition has a thickening time in the range of about 2 to about 15 hours at a temperature of 80° F.

19. The composition of claim 11, wherein the cement composition develops a compressive strength greater than 50 psi at a temperature of 120° F., a pressure of 3,000 psi, and a time of 24 hours.

20. The composition of claim 11, wherein the cement composition has a density in the range of about 12 to about 18 pounds per gallons.

* * * * *